US008155081B1

(12) United States Patent  
Mater et al.

(10) Patent No.: US 8,155,081 B1  
(45) Date of Patent: Apr. 10, 2012

(54) SELF LEARNING ROAMING OPTIMIZATION

(75) Inventors: Olaf Mater, Eggenstein-Leopoldshafen (DE); Joachim Schmalz, Bischweir (DE)

(73) Assignee: Marvell International Ltd., Hamilton (BM)

( * ) Notice: Subject to any disclaimer, the term of this patent is extended or adjusted under 35 U.S.C. 154(b) by 983 days.

(21) Appl. No.: 12/124,682

(22) Filed: May 21, 2008

Related U.S. Application Data

(60) Provisional application No. 60/939,189, filed on May 21, 2007.

(51) Int. Cl.
*H04W 4/00* (2009.01)
*H04L 12/28* (2006.01)
*H04W 36/00* (2009.01)
*H04W 24/00* (2009.01)

(52) U.S. Cl. ........ 370/331; 370/254; 370/338; 455/437; 455/440; 455/456.6

(58) Field of Classification Search .................. 370/254, 370/331, 338; 455/436, 440, 441, 446, 437, 455/456.6
See application file for complete search history.

(56) References Cited

U.S. PATENT DOCUMENTS

| 6,813,508 | B1 * | 11/2004 | Shioda et al. ................. 455/525 |
| 2004/0039817 | A1 * | 2/2004 | Lee et al. ...................... 709/225 |
| 2004/0190718 | A1 * | 9/2004 | Dacosta ........................ 380/247 |
| 2005/0270236 | A1 * | 12/2005 | Krumm et al. ................ 342/451 |
| 2006/0046709 | A1 * | 3/2006 | Krumm et al. ............. 455/422.1 |
| 2007/0259624 | A1 * | 11/2007 | Alizadeh-Shabdiz et al. ........................ 455/67.11 |
| 2008/0242305 | A1 * | 10/2008 | Kahlert et al. ................ 455/440 |

* cited by examiner

*Primary Examiner* — Ricky Ngo
*Assistant Examiner* — Paul Masur

(57) ABSTRACT

A self learning roaming optimization approach allows a wireless client device to build signal strength maps that store wireless network access point signal strengths at locations along paths traveled by the wireless client device within an operational environment. The signal strengths collected at locations along a path may be analyzed to determine a recommended wireless network access point at the respective locations to achieve a reliable wireless network connection along the mapped path. The stored recommendations may take into account changes in wireless network access point signal strengths, e.g. due to obstructions and/or electromagnetic shields that may block portions of a wireless network access point signal at subsequent locations along the mapped path. A wireless client device may recognize the wireless client device's location along a previously mapped path based on the unique combination, or signature, of wireless network access point signal strengths measured at the wireless client device's location.

41 Claims, 8 Drawing Sheets

SELF LEARNING ROAMING OPTIMIZATION

INCORPORATION BY REFERENCE

This application claims the benefit of U.S. Provisional Application No. 60/939,189, "Self Learning Roaming Optimization" filed by Olaf Mater on May 21, 2007, which is incorporated herein by reference in its entirety.

BACKGROUND

Wireless networks, such as infrastructure mode wireless networks based on Institute of Electrical & Electronics Engineers (IEEE) Standard 802.11, allow wireless client devices to establish communication connections to the wireless network via wireless network access points. Each wireless network access point, or access point, provides wireless network connectivity to wireless client devices within radio communication range of the access point. Due to limitations on the transmission/reception range, or coverage area, of individual access points, a wireless network may use multiple access points within an operational environment, such as a single building or multi-building campus. By overlapping the coverage areas of multiple access points, network engineers attempt to provide wireless client devices, at any location within the operational environment, with at least one access point with sufficient signal strength to support a reliable connection to the wireless network.

On starting up, a wireless client device scans its surrounding operational environment to identify one or more access points with sufficient signal strength at the wireless client device's location to support reliable communication. The wireless client device may establish a wireless network connection, or communication link, via the access point with the strongest signal. Once a wireless network connection is established, should a link quality of the communication link degrade, e.g., due to the wireless client device physically moving to another location within the operational environment, the wireless client device may initiate a subsequent scan of the operational environment to identify another access point with greater signal strength at the new location and, therefore, capable of providing a communication link with improved link quality. This process continues for as long as the wireless client device is within the operational environment supported by the wireless network and wishes to maintain a wireless network connection.

Some obstacles within an operational environment, such as iron girders, fireproofed stairwells, thick masonry walls, and/or rooms with electromagnetic shields, for example, may block access point signals. Such obstacles are typically taken into account in the design of a properly designed wireless network by strategically positioning a sufficient number of access points so that such blocked areas are covered by at least one other access point. However, a sudden and severe reduction in the signal strength of an access point caused by such obstacles can adversely affect the wireless network connections of wireless client devices traveling through the operational environment while connected to the wireless network via the blocked access point. For example, such a reduction in signal strength may result in a loss of the wireless network connection before access to the wireless network via an alternate access point can be established.

SUMMARY

The self learning roaming optimization approach described below contemplates building and storing an operational environment map for each unique operational environment encountered by the client device. Each operational environment map may store access point signal strengths, environmental conditions or other indications of a best access point at locations along paths traveled by the client device within an operational environment, i.e., each cluster of access points that together provide access to a common wireless network, encountered by the client device. Stored signal strength values and/or other environmental conditions may be analyzed to determine the best access point to select at the respective locations the next time the path is traveled, in order to achieve a reliable wireless network connection along the path.

Portions of paths within an operational environment may correspond with, for example, corridors, rooms and stairwells within buildings, walking paths between buildings, and/or roads within the wireless operational environment. Such paths are typically bi-directional. The signal strengths collected at locations along a path may be analyzed to determine a best access point to select at the respective locations, taking into account changes in access point signal strengths at subsequent locations along the mapped path due, for example, to obstacles within the operational environment, as addressed above, that may abruptly block or degrade a communication link with an access point. Such a path analysis may determine, for example, that the best access point for a client device traveling along the path in a selected direction is not the access point with the strongest signal strength at the current location of the client device, but rather, an access point with a lesser signal strength at the current client device location, but with a stronger, or less degraded, signal strength at locations further along the path.

The approach may allow a client device to recognize an operational environment in which the client device is situated based on unique identifiers, e.g., unique MAC addresses, associated with access points detected within the operational environment. For example, if a MAC address received from an access point matches a MAC address in an operational environment map stored in the client device, the client device may retrieve the identified operational map for use by the client device while the client device remains in the identified operational environment. Further, a client device may recognize its location along a previously mapped path within the identified operational environment map based on a unique combination of access point signal strengths measured at the client device's current location. The unique combination of access point signal strengths associated with a location within an operational environment may serve as a signature by which the location may be found within an operational environment map previously generated for the operational environment. Each unique location may be associated with a unique path stored in the operational environment map. Therefore, by detecting a location for a client device within an operational environment map, the path along which the client device is traveling may also be detected. In addition, the client device may determine the direction that the client device is traveling along a previously mapped path within the identified operational environment map by comparing access point signal strengths at subsequent locations in the identified operational environment to access point signal strengths previously stored for other locations along the path in the operational environment map.

Once an operational environment map, location, path and path direction are determined, a client device may determine which access point to select for connection to the wireless network based on the access point recommended by the operational environment map for a client device at the determined location, traveling along the determined path in the determined path direction. However, to accommodate changes in an operational environment, and/or changes in the paths taken by a client device through an operational environment, the described approach allows a client device to easily switch between a learning mode, in which the client device records new locations in a series of locations stored as a path within the operational environment map for an operational environment, and a map mode, in which the client device selects a next access point based on analyzed path location information previously stored in the operational environment map for an operational environment.

In learning mode, a client device may connect to the wireless network via an access point with the strongest signal strength identified by scanning access points available to the client device at each new location. However, in learning mode, the client device may also store, for future use by the client device, the respective access point signal strengths measured for each location in an operational environment map of the current operational environment, in association with a path through the operational environment. For example, different combinations of signal strengths detected by a client device within an operational environment may be stored as locations along a path within an operational environment map of the operational environment, the stored unique combination of signal strengths serving as a unique signature for the location.

Signal strengths stored for locations along a path in an operational environment map may be analyzed to provide, for each path direction that may be traveled along the path, a recommended access point. The path analysis process may take into account, when determining the best access point for a client device to select, the signal strengths stored in the operational environment map for the respective access points at subsequent locations along the path in the path direction being traveled by the client device. In this manner, the client device may be directed away from selecting an access point that is known to suffer a serious degradation in signal strength at subsequent locations along the path, although the access point may exhibit the strongest signal strength at the present location.

In map mode, a client device may navigate along a path previously traveled by the client device by selecting access points based on those recommended by the stored operational environment map. In this manner, the client device is able to avoid the overhead associated with access point scanning, while improving the reliability of the network connection maintained by the client device. The approach allows the client device to leverage knowledge of the operational environment collected on previous traverses of a path through the operational environment.

The described self learning roaming optimization approach allows a client device to readily switch between the described learning mode and the described map mode. In this manner the client device may take advantage of the efficiencies and improved routing associated with map mode, and may readily adapt to changes in the operational environment and/or expand its knowledge of new paths traversed through an operation environment by the client device.

Using the described self learning roaming optimization approach a client device is able to optimize access point selection based on previous travels within the operational environment. The operational environment map generated for each unique operational environment may be stored in non-volatile memory so that even if the client device is powered down, the recorded prior knowledge gained via previous travels within the operational environment are retained.

For example, at startup, a client device may scan its operational environment to locate access points available at its current location as well as signal strengths supported by the respective access point available at its current location. Assuming that an access point associated with a stored operational environment map is identified, and assuming that the client device is able to identify its current location and path based on the signature of detected access points/signal strengths, and assuming that the client device is able to determine its direction of travel along the path, the client device may initiate map mode, and proceed to select subsequent access points based on recommended access points stored in the operational environment map for subsequent locations along the path in the current path direction. However, if the client device is unable to determine its current location and path within an identified operational environment map, the client device may initiate a learning mode, and may proceed to build a new path within the identified operational environment. Further, if the client device is unable to locate an operational environment map that includes any of the access points detected at its current location, the client device may initiate a learning mode and may proceed to build a new operational environment map.

The use of stored operational environment maps, in map mode, to select a next access point for a client device traveling along a previously traveled mapped path allows a client device to save power and avoid the network overhead associated with access point scanning. Further, in both map mode and learning mode, if a client device is required to perform a scan of the client device's current operational environment, the client device may initially perform a partial scan, in which only those access points associated with the operational environment via the currently selected operational environment map may be scanned. If a partial scan of the operational environment is unsuccessful, a full scan may be performed in which the operational environment may be scanned for all potentially available access points. Using such a combination of techniques, a client device that supports the described learned roaming optimization approach may greatly reduce the network overhead typically placed on wireless access points by wireless client devices, thereby increasing network bandwidth and improving network throughput.

BRIEF DESCRIPTION OF THE DRAWINGS

Examples of embodiments of a wireless network client device, or client device, that supports learned roaming optimization in wireless networks will be described with reference to the following drawings, wherein like numerals designate like elements, and wherein.

DETAILED DESCRIPTION OF EMBODIMENTS

Figure 1:
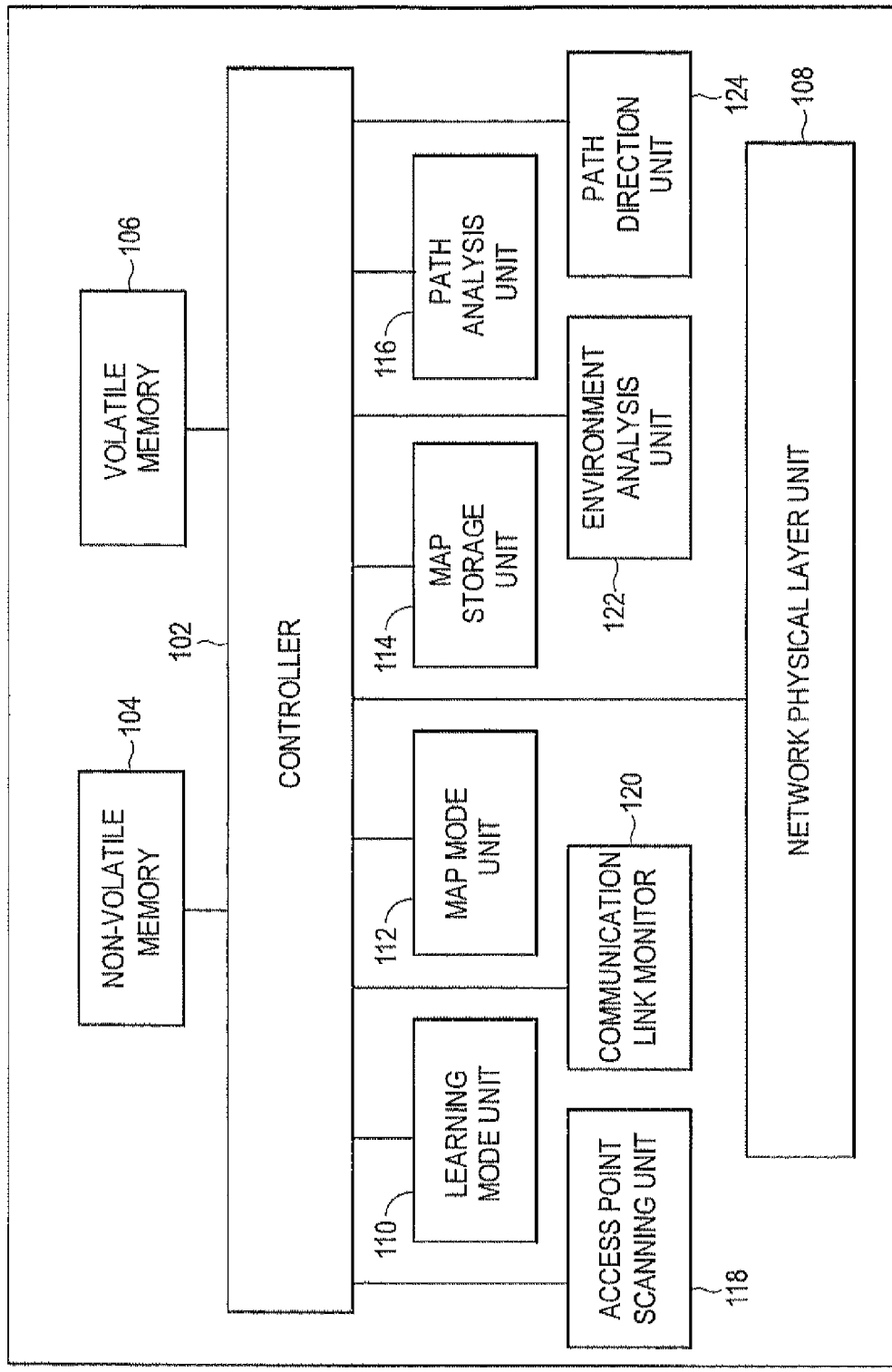
FIG. 1 is a block level diagram of an example of a client device that supports learned roaming optimization in wireless networks.

FIG. 1 is a block level diagram of an example of a client device that supports learned roaming optimization such as by self learning in wireless networks. As shown in FIG. 1, a client device 100 may include a controller 102 in communication with a non-volatile memory 104, a volatile memory 106 and a network physical layer unit 108. In addition, controller 102 may communicate with a learning mode unit 110, a map mode unit 112, a map storage unit 114, a path analysis unit 116, an access point scanning unit 118, a communication link monitor 120, an environment analysis unit 122 and a path direction unit 124.

The features included within client device 100 may be integrated within one or more electronic devices, such as a desktop, laptop or hand-held computer, internet protocol (IP) phone, digital camera, digital video camera, overhead projector/display device, scanner, printer, plotter, or any other electronic device, thereby allowing the respective electronic devices to establish wireless network connections to the operational environment's wireless network.

For example, in one embodiment, functions performed by network physical layer unit 108, e.g., layer 1, or physical layer, of the Open System Interconnection (OSI) model, may be performed, by a network interface card (NIC) added to an electronic device, or by a physical layer unit embedded with an electronic device's circuitry. Functions performed by controller 102, and subsequent layers of the OSI model, or other network communication model, may be performed by software executed, for example, by a general microprocessor in electronic devices, such as a desktop or a laptop computer, or may be executed, for example, by a separate processor in electronic devices such as printers, digital cameras, digital video cameras, overhead projector/display devices, scanners, plotters, or any other electronic device.

Controller 102 may control processing related to the receipt and transmission of messages across network physical layer unit 108 in accordance with existing wireless network standards, such as the wireless network standard described in IEEE 802.11. In addition, controller 102 may support learned roaming optimization, which may be self learned, as described in greater detail below. Volatile memory 106, may allow the controller 102 to store program instructions in local memory for execution and to store and maintain temporary variables necessary for execution of the stored program instructions. Non-volatile memory 104, may allow controller 102 to access and retrieve larger bodies of data and program instructions for later execution by controller 102.

Process examples executed as a result of the execution of such instructions are addressed below with respect to FIGS. 3 through 8. For example, controller 102 may control overall operation of client device 100 in accordance with the process examples described below with respect to FIG. 3 through FIG. 8, by providing instructions and/or control parameters to one or more of learning mode unit 110, map mode unit 112, map storage unit 114, path analysis unit 116, access point scanning unit 118, communication link monitor 120, environment analysis unit 122 and path direction unit 124.

Learning mode unit 110 may allow controller 102 to record and store path information as a client device traverses a new path through an operational environment in learning mode. Learned path information may be used locally or shared with other client devices on a network. As described in greater detail below, path information may be stored as a series of locations. Each location may store a signal strength for each access point detected by access point scanning unit 118 at that location. The stored location information may be analyzed by path analysis unit 116 to recommend an access point for use by the client device when traversing the respective paths in map mode. Recommended access points may be stored in the respective maps in association with each path location. A client device may readily switch between learning mode and map mode, as described in greater detail below with respect to FIG. 6 and FIG. 7. In this manner the client device may take advantage of the efficiencies and improved routing associated with map mode, and may readily adapt to changes in the operational environment and/or expand its knowledge of new paths traversed through an operation environment by the client device with learning mode.

Map mode unit 112, may be used by controller 102 to control selection of access points when traversing a previously traveled path through an operational environment. In map mode, when the client device's current signal begins to degrade, controller 102 may select a next access point recommended from an operational environment map stored within the client device. For example, an operational environment map may be organized as a collection of paths through the operation environment. Each path may include a sequence of locations, and for each location a recommended access point may be stored. Once a path, a location and a direction along the path is determined for a client device 100 traveling through an operational environment, controller 102 may select a next access point for the client device based on the access point recommended by the map for the next location along the path.

Map storage unit 114 may be used by controller 102 to store access point map information for one or more operational environments. For example, map information for an operational environment may include a list of unique identifiers, e.g., MAC addresses, of access points servicing the operational environment. In addition, an operational environment map may include stored path information, the path information including a path identifier, and in association with a path identifier, a sequential series of location identifiers. In association with each location identifier, the map may store a signal strength for each access point detected by scanning for access points at that location. Therefore, the signal strengths of the respective access points at a location may provide a unique signature that the client device may use to identify the location. In such an embodiment, a location within an operational environment map may correspond with a physical area within an operational environment that has substantially the same access point signal strength signature, i.e., access point signal strengths within the physical areas are within a predetermined threshold, which may be a predetermined threshold chosen for assessing the physical area boundaries associated with a location, of the access point signal strengths recorded for the location. Optionally, other known methods for location identification, for example, global positioning system (GPS) based location identification, may be employed.

Path analysis unit 116 may be invoked by controller 102 to recommend, and to store within a map, an access point for each location in each path of the map. These access point recommendations may be used by client device 100 when traversing the respective paths in map mode. Recommended access points may be stored in the respective maps in association with each path location. The selection of a recommended access point for a location may be based on several factors which may include the signal strengths of the respective access points at the location, as well as the signal strengths of the respective access points at one or more next locations in the path in the direction client device 100 is moving. In one example of a client device 100, path analysis unit 116 may recommend and store two access points for each location in a path. A first access point may be stored for recommendation to a client device when the client device is traveling a path in a first direction; a second access point may be stored for recommendation to a client device when the client device is traveling the path in a second direction.

Access point scanning unit 118 may be invoked by controller 102 to scan for all available access points and to determine the respective signal strength that may be obtained from the respective access point via the channels supported by each. As described in greater detail below, access point scanning unit 118 may be invoked at a startup of client device 100, to determine whether client device 100 is in an operational environment, for example, an office building or campus, for which an operational environment map has been stored. Access point scanning unit 118 may also be invoked in map mode, and/or in learning mode, whenever controller 102 requests a scan of the operational environment. In one embodiment, in response to a request for a full scan, access point scanning unit 118 may scan for all available access points and all available channels supported by the respective access points and may provide controller 102 with a list of access points, the channels supported by each, and the signal strengths received on each channel. In response to a request for a partial scan, access point scanning unit 118 may scan only those access points and channels known to be available in the current operational environment, based on prior full scans of the operational environment. Such a partial scan may provide controller 102 with a list of the signal strengths received on each specific access point scanned.

Communication link monitor 120 may monitor the signal strength and/or link quality of a channel that has been selected by client device 100. For example, if the signal strength and/or link quality of the selected channel drops by a predetermined value, or by a predetermined percentage, communication link monitor 120 may inform controller 102. Controller 102 may use this information, as described in greater detail below, for example, with respect to FIG. 5 through FIG. 7, to determine when to, for example, scan the operational environment for access points, or to switch to another access point, as recommended by a stored map.

Environment analysis unit 122 may be used by controller 102 to assess an operational environment, for example, at startup or after a restart, to determine whether the operational environment is a new environment, or an environment for which the client device has stored maps. For example, at startup or after a restart, environment analysis unit 122 may request, for example, through controller 102, that access point scanning unit 118 perform a full scan of the operational environment. If any of the access points identified in the scan match, for example, based on the unique MAC address assigned to each access point, an access point stored in a map, the client device may progress to map mode, otherwise, the client device may proceed to learning mode.

Path direction unit 124 may be used by controller 102 to determine a direction in which a client device 100 is moving along a path in a map. For example, assuming the signal strengths reported by access point scanning unit 118 match a location within a map, since each location may be associated with a path in the map, the path within the map may also be identified. However, before controller 102 may recommend an access point that avoids drops in signal strength due to obstacles in the environment, controller 102 may need to ascertain that the client is in motion and may need to ascertain the direction in which the client device is proceeding along a path. For example, in one example of client device 100, path direction unit 124 may initially assign to client device 100 the access point with the strongest signal and continue to monitor the status of the signal strength of the client device until a second scan may be performed at a second location. If the signal strengths at the new location match a second point along the current path, the direction along the path is known, and the map may be used to assign subsequent best access points in map mode. If the signal strengths at the new location do not match a second point along the current path, client device 100 may be placed in learning mode.

Table 1, below, is an example of a generic operational environment map that may be used by a client device to store path information for multiple operational environments. As shown in Table 1, an operational environment map may store information related to any number of operational environments, e.g., $OpEnv_1$ through $OpEnv_T$. For example, each operational environment may include any number of paths, e.g., $Path_1$ through $Path_P$, and each path may include any number of locations, e.g., $Loc_{11}$ through $Loc_{PL}$, in which the first digit in the location identifier identifies a path and the second digit in the location identifier identifies a sequence order of the location in the path. As further shown in Table 1, each operational environment may include any number of access points, e.g., $AP_{11}$, through $AP_{1N}$, and the map may store a unique identifier, e.g., a MAC address, for each access point providing service to portions of the operational environment.

For each location identified within a path, the map may store access point signal strengths measured at the location by, for example, point scanning unit 118. For example, as shown in Table 1, location $LOC_{21}$, i.e., the first location in $Path_2$, the signal strength for $AP_{11}$ is 30%, the signal strength for $AP_{12}$ is 40%, the signal strength for $AP_{13}$ is 80%, and the signal strength for $AP_{1N}$ is 90%. Further, the recommended access point for location $LOC_{21}$ in the forward path direction is $AP_{13}$, and the recommended access point for location $LOC_{21}$ in the reverse path direction is $AP_{1N}$. Note that although Table 1 shows only exemplary signal strength data for each detected access point at each location, other measures of access point link quality may also be stored in a map for each detected access point at each location, thereby providing additional information that may be used to determine the access point capable of providing a best link quality at each of the respective locations for a client device traveling a path in a determined direction.

As described below with respect to FIG. 8, once signal strengths and/or other signal quality data is stored within a map for locations along a path, the data may be analyzed to determine a best access point for use by a client device at each location along the path as the client travels along the path in a determined direction. Such an analysis may be used to select access points that maintain a best link quality throughout the path while traveling in a determined direction. Such an analysis may result in the selection of an access point that, for example, does not have the strongest signal strength or best link quality at a given location, if the map indicates that the access point suffers from significant degradation in signal strength or other measures of link quality at subsequent locations along the path in the direction the client device is traversing the path. Further, the recommended access point at a given location along a path may be different depending on the direction the client device is traversing, due to the subsequent degradation in each of the respective directions. For example, as shown in Table 1, a recommended access point for each location in the respective paths when a client device traverses the respective paths in a direction designated as a forward direction is stored for each location in the $DIR_{FOR}$ column of Table 1, and a recommended access point for each location in the respective paths when a client device traverses the respective paths in a direction opposite the designated forward direction, or reverse direction, is stored for each location in the $DIR_{REV}$ column of Table1. The analysis process used to determine these recommended access points, for example, as described below with respect to FIG. 8, may take into account degradation in signal strengths due to obstacles and/or other forms of interference, so that a best link quality is maintained through the path while traversing the path in a determined direction.

TABLE 1

Example of a Generic Operational Environment Map

| $OpEnv_1$ | | $AP_{11}$ | $AP_{12}$ | $AP_{13}$ | ... | $AP_{IN}$ | $DIR_{FOR}$ | $DIR_{REV}$ |
|---|---|---|---|---|---|---|---|---|
| $PATH_1$ | | | | | | | | |
| | $LOC_{11}$ | 40% | 80% | 90% | ... | 60% | $AP_{12}$ | $AP_{11}$ |
| | $LOC_{12}$ | 40% | 75% | 30% | ... | 60% | $AP_{12}$ | $AP_{12}$ |
| | $LOC_{13}$ | 40% | 90% | 70% | ... | 60% | $AP_{12}$ | $AP_{12}$ |
| | ... | ... | ... | ... | ... ... | ... | ... | ... |
| | $LOC_{1L}$ | 40% | 75% | 85% | ... | 60% | $AP_{13}$ | $AP_{13}$ |
| $PATH_2$ | | | | | | | | |
| | $LOC_{21}$ | 30% | 40% | 80% | ... | 90% | $AP_{13}$ | $AP_{IN}$ |
| | $LOC_{22}$ | 30% | 40% | 75% | ... | 30% | $AP_{13}$ | $AP_{13}$ |
| | $LOC_{23}$ | 30% | 40% | 90% | ... | 70% | $AP_{13}$ | $AP_{13}$ |
| | ... | ... | ... | ... | ... ... | ... | ... | ... |
| | $LOC_{2L}$ | 30% | 40% | 75% | ... | 85% | $AP_{IN}$ | $AP_{IN}$ |
| ... | ... | ... | ... | ... | ... ... | ... | ... | ... |
| $PATH_P$ | | | | | | | | |
| | ... | ... | ... | ... | ... ... | ... | ... | ... |
| $OpEnv_2$ | | $AP_{21}$ | $AP_{22}$ | $AP_{23}$ | ... | $AP_{2N}$ | $DIR_{FOR}$ | $DIR_{REV}$ |
| ... | ... | ... | ... | ... | ... ... | ... | ... | ... |
| $OpEnv_T$ | | $AP_{T1}$ | $AP_{T2}$ | $AP_{T3}$ | ... | $AP_{TN}$ | $DIR_{FOR}$ | $DIR_{REV}$ |
| ... | ... | ... | ... | ... | ... ... | ... | ... | ... |

Figure 2:
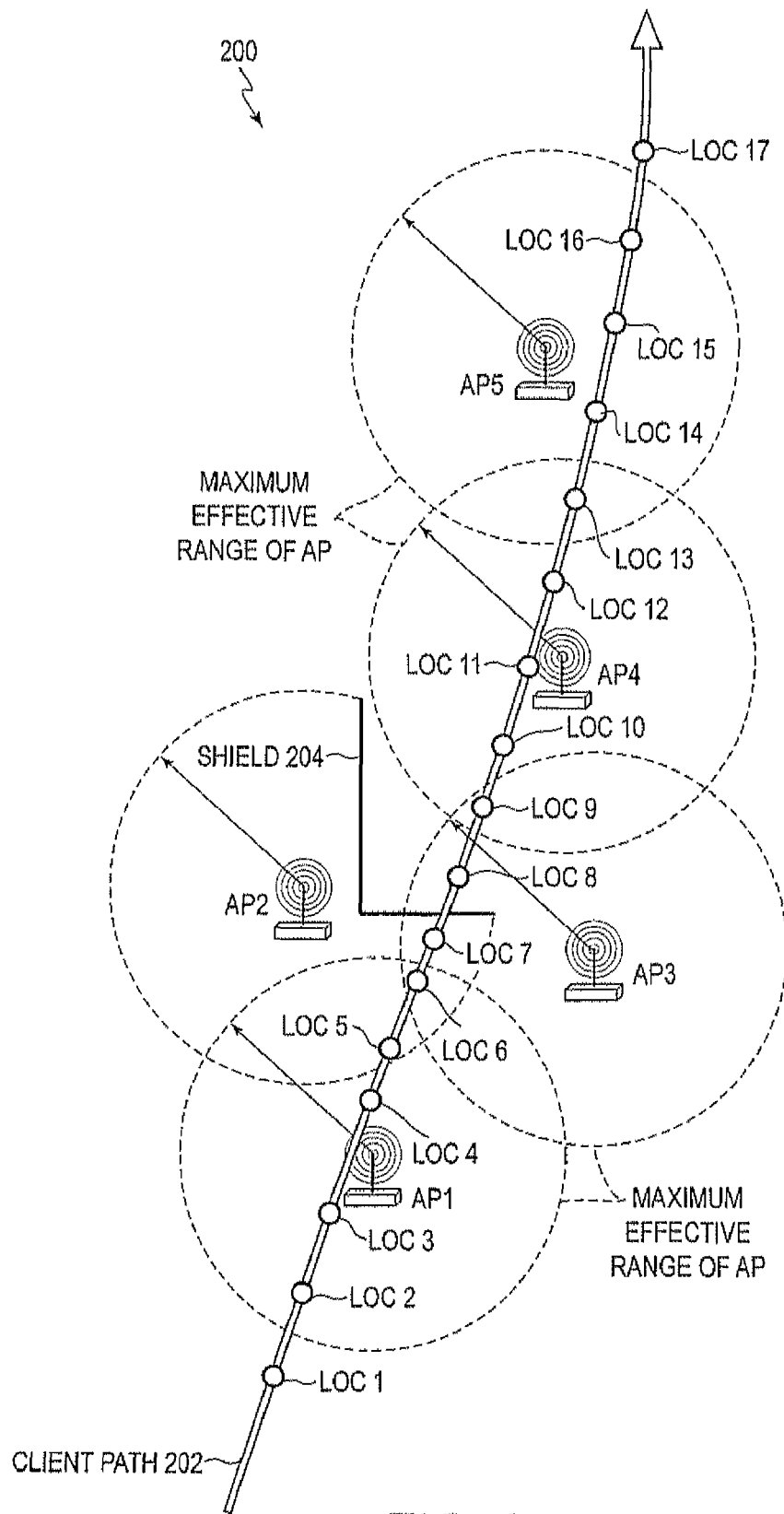
FIG. 2 is a schematic diagram of an example of overlapping coverage areas of access points that support a wireless network and an example of a physical path traveled by a client device through the coverage areas of the respective access points.

FIG. 2 is a schematic diagram of an example of an operational environment 200 that depicts overlapping coverage areas of access points that support a wireless network in operational environment 200. FIG. 2 also depicts an example of a client path 202 that may be traveled by a client device through the respective overlapping coverage areas of the access points that support a wireless network in operational environment 200, for example, a corridor in an office building. For example, as shown in FIG. 2, a client device may start at location $LOC_1$ and may proceed through the operational environment to location $LOC_{17}$. Each of locations $LOC_1$ through $LOC_{17}$ represents an example of locations along such a path where a client device, operating in learning mode as described in greater detail below, may have recorded access point signal strengths.

As shown in FIG. 2, each access point is capable of conducting wireless communication with a client device within operational environment 200 within a distance identified, in FIG. 2, as the maximum effective range of the access point. In FIG. 2, the maximum effective range is shown as a circle of uniform shape and size, with an access point at the center of the maximum effective range area. For purposes of FIG. 2, the maximum effective range of an access point may be a maximum range at which the access point may provide a wireless communication connection of a predetermined acceptable link quality. In general, the link quality between a client device and an access point decreases with the distance of the client device from the access point. In examples of client devices, a predetermined acceptable link quality may be quantified by, for example, one or more of a predetermined maximum transmission error rate, a minimum acceptable bit transmission rate or a minimum acceptable signal strength. For example, in one example of a client device, a predetermined acceptable link quality, and hence the maximum effective range of the access point may correspond to a signal strength that is 65% of a signal strength capable of providing a best possible link quality.

FIG. 2 is intended to provide a representative view of an operational environment supported by a wireless network that illustrates operation of an embodiment of the invention. For example, the maximum effective range of an access point may vary between access point devices. Further, the transmission/reception area of an access point is not limited to a circular area centered about the access point. For example, an access point with a directional antenna may have a transmission/reception area that is directed in one or more specific directions from the access point. The maximum effective range of an access point may be severely affected by obstructions to the transmission/reception of access point signals, such as electromagnetic shields around secured rooms/corridors, steel columns and fireproofed stairwells, and certain electronic devices. For example, FIG. 2 shows one such shield 204, or obstruction, that affects transmissions from access point 2. Connection of a client to $AP_2$ while moving along path 202 may require switching to $AP_3$ to maintain continuity, while avoiding switching to $AP_2$, and selecting $AP_3$ would enable greater continuity, even though $AP_2$ may be stronger at some locations. An actual operational environment may include hundreds of full and/or partial obstructions to access point transmissions that distort at specific locations, the maximum effective range of the respective access point transmission/reception areas. Further, due to changes in an operational environment, such as the relocation of an access point antenna, removal or failure of an access point, insertion of a new access point, changes in the physical layout of facilities within the operational environment due to construction, and/or movement within the operational environment of equipment causing electromagnet interference, the maximum effective range of the respective access point transmission/reception areas may change.

Table 2, below, is an example of an operational environment map that may be used by a client device to store location information for each of locations $LOC_1$ through $LOC_{17}$ in FIG. 2. As shown in Table 2, an operational environment map may store information related to each location for which a client device 100, e.g., via controller 102 and access point scanning unit 118, has collected signal strengths from access points serving operational environment 200. As shown in Table 2, measured signal strengths, for comparison purposes, may, for example, be represented as percentages of a predetermined full signal strength, however, the measured signal strengths could also be represented in other ways, for example, with absolute numbers that reflect the respective measured strength of each signal.

Please note that the circles shown as dashed lines around each of the respective access points in FIG. 2 represent an example of a maximum effective range of the access point with respect to supporting a communication link of sufficient link quality. For example, the maximum effective range of an access point may, for example, correspond to a signal strength of 65% or some other signal strength below which the link quality is determined to be unsatisfactory, e.g., the signal strength may not be sufficiently high to support a wireless communication connection of a predetermined sufficiently high link quality. However, the signal strength of the respective access points outside of the indicated maximum effective range of the respective access point does not immediately drop from the maximum effective range signal strength of 65% to 0% outside the dotted line circles shown in FIG. 2. Therefore, such weak signals outside the maximum effective range of an access point may still be used as part of the signal strength based signatures of locations within the operational environment.

For example, although FIG. 2 indicates five locations, i.e., $LOC_2$, $LOC_3$, $LOC_4$, $LOC_5$ and $LOC_6$, within the maximum effective range of $AP_1$, Table 2 provides more that five signal strengths for $AP_1$. However, please note that only the five locations within the maximum effect range shown in FIG. 2 for $AP_1$, are shown in Table 2 to have signal strengths greater than the signal strength, i.e., 65%, selected as the signal strength corresponding to the maximum effect range for each access point shown in FIG. 2. For example, as shown in Table 2, only the locations shown in FIG. 2 within the maximum effective access point range are shown to have signal strengths greater than 65%. Table 2 may retain such information because the data collected for an access point outside the maximum effective range of the access point may still be helpful in providing a unique signature for that location.

Please note that the effects of the shield, shown in FIG. 2 at 204, on the maximum effective range of the $AP_2$ are reflected in Table 2 at the transition between $LOC_7$ and $LOC_8$, where the signal strength for $AP_2$ along $Path_1$ suddenly drops from 75% to 0%. Also, please note that Table 2 also reflects the overlap of the maximum effective ranges of the respective access point shown in FIG. 2. For example, as indicated in both FIG. 2 and Table 2, the effective range of $AP_1$ overlaps the effective range of $AP_2$ at $LOC_5$ and $LOC_6$, and the effective range of $AP_1$ overlaps the effective range of $AP_3$ at $LOC_6$; the effective range of $AP_2$ overlaps the effective range of $AP_3$ at $LOC_6$; the effective range of $AP_3$ overlaps the effective range of $AP_4$ at $LOC_9$; and the effective range of $AP_4$ overlaps the effective range of $AP_5$ at $LOC_{13}$.

Note that Table 2 contains signal strength information for five access points, $AP_1$ through $AP_5$; however, the first time a client device travels through a new operational environment the client device may, initially, not be aware of any access points. Therefore, as each new access point is detected, the client device may add the access point to the map. For example, as shown in Table 2, at location $LOC_1$, access points $AP_1$, $AP_2$ and $AP_3$ were detected, and, therefore, signal strengths corresponding to those access points would have been added to the map when detected at location $LOC_1$. However, according to the map shown in Table 2, $AP_4$ was not detected until location $LOC_4$, therefore, signal strengths corresponding to $AP_4$ would have been added to the map when detected at location $LOC_4$ and values for $AP_4$ in locations $LOC_1$ through $LOC_3$ would have been set to 0%. Similarly, according to the map shown in Table 2, $AP_5$ was not detected until location $LOC_8$, therefore, signal strengths corresponding to $AP_5$ would have been added to the map when detected at location $LOC_8$ and values for $AP_5$ in locations $LOC_1$ through $LOC_7$ would have been set to 0%.

As shown in Table 2, the access point signal strengths measured at the respective locations, i.e., LOC1 through LOC17, may be unique. For example, a measured signal strength may depend on the distance of the client device from an access point and/or the presence of any signal affecting obstacles/shields located between the client device and the access point. Such conditions may be unique to different physical locations throughout an operational environment. Therefore, the signal strength measurements at a location, and/or any combination of one or more link quality measures between a client device and an access point at a location, may be used as a signature for the location itself.

TABLE 2

Operational Environment Map Corresponding to FIG. 2

| $PATH_1$ | | $AP_1$ | $AP_2$ | $AP_3$ | $AP_4$ | $AP_5$ | $DIR_{FOR}$ | $DIR_{REV}$ |
|---|---|---|---|---|---|---|---|---|
| | $LOC_1$ | 60% | 20% | 25% | 0% | 0% | $AP_1$ | $AP_1$ |
| | $LOC_2$ | 75% | 30% | 35% | 0% | 0% | $AP_1$ | $AP_1$ |
| | $LOC_3$ | 90% | 40% | 45% | 0% | 0% | $AP_1$ | $AP_1$ |
| | $LOC_4$ | 90% | 50% | 55% | 10% | 0% | $AP_1$ | $AP_1$ |
| | $LOC_5$ | 75% | 65% | 62% | 20% | 0% | $AP_1$ | $AP_1$ |
| | $LOC_6$ | 65% | 75% | 70% | 30% | 0% | $AP_2$ | $AP_2$ |
| | $LOC_7$ | 50% | 75% | 73% | 40% | 0% | $AP_3$ | $AP_2$ |
| | $LOC_8$ | 40% | 0% | 70% | 50% | 5% | $AP_3$ | $AP_3$ |
| | $LOC_9$ | 30% | 0% | 65% | 67% | 15% | $AP_3$ | $AP_3$ |
| | $LOC_{10}$ | 20% | 0% | 55% | 70% | 30% | $AP_4$ | $AP_4$ |
| | $LOC_{11}$ | 10% | 0% | 45% | 90% | 45% | $AP_4$ | $AP_4$ |
| | $LOC_{12}$ | 0% | 0% | 35% | 70% | 60% | $AP_4$ | $AP_4$ |
| | $LOC_{13}$ | 0% | 0% | 25% | 67% | 75% | $AP_5$ | $AP_5$ |
| | $LOC_{14}$ | 0% | 0% | 15% | 50% | 90% | $AP_5$ | $AP_5$ |
| | $LOC_{15}$ | 0% | 0% | 5% | 40% | 90% | $AP_5$ | $AP_5$ |
| | $LOC_{16}$ | 0% | 0% | 0% | 30% | 75% | $AP_5$ | $AP_5$ |
| | $LOC_{17}$ | 0% | 0% | 0% | 20% | 60% | $AP_5$ | $AP_5$ |

As further shown in Table 2, once all location signal strength information for a path is stored in the map, the location information may be assessed by, for example, path analysis unit 116, to populate each path location with a recommended access point for a client device traversing the path in a forward direction, $DIR_{FOR}$, and a recommended access point for a client device traversing the path in a reverse direction, $DIR_{REV}$. These recommended access points may be used by a client device, on future travels along the path while operating in map mode, to select an optimal access point without scanning, as described in greater detail below.

Figure 3:
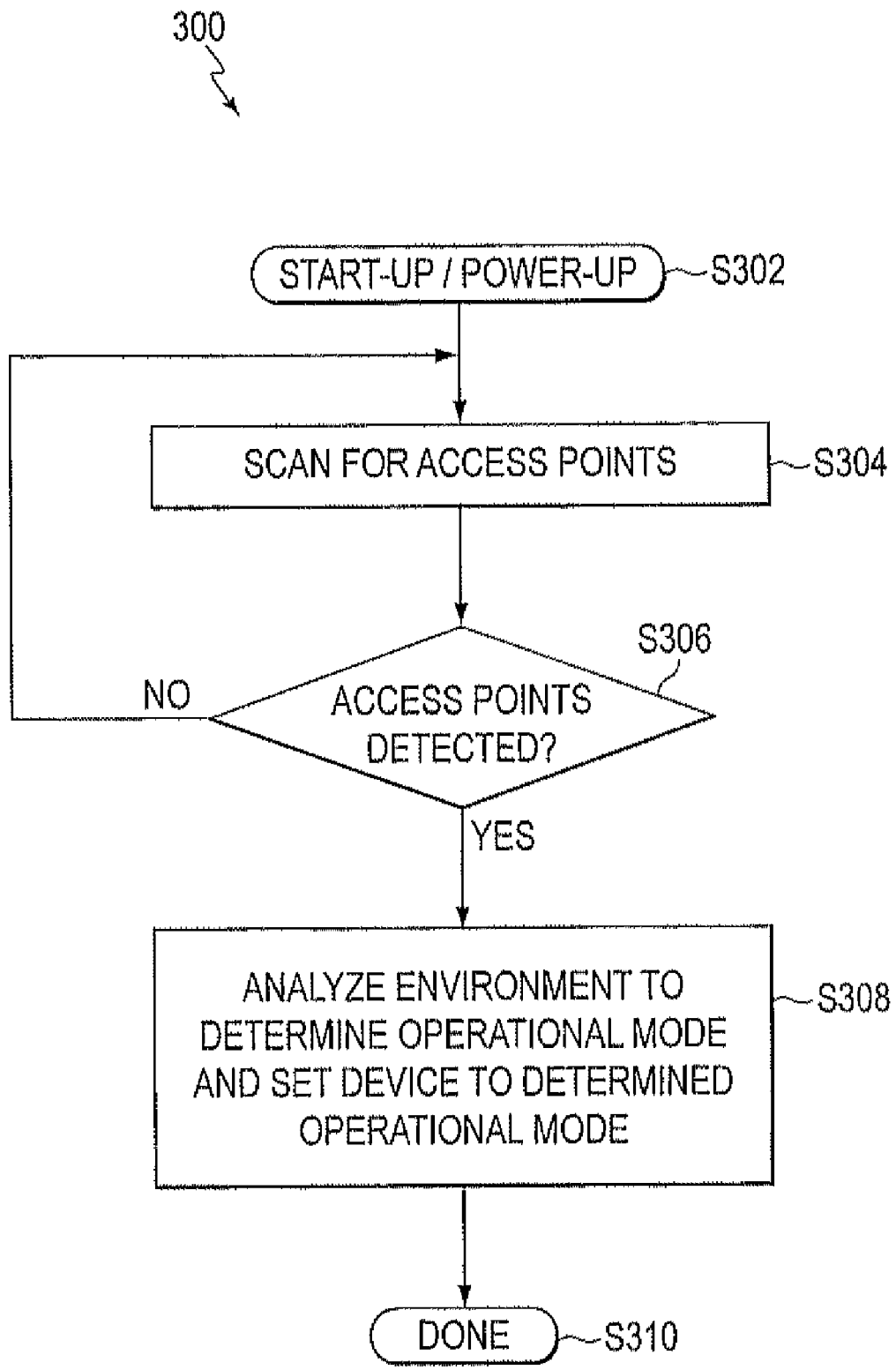
FIG. 3 is a flow diagram of an example of a startup process that may be executed by an example of a client device that supports learned roaming optimization.

FIG. 3 is a flow diagram 300 of an example of a startup process that may be executed by an example of a client device that supports learned roaming optimization. For example, the process described below with respect to FIG. 3 may be executed by controller 102 of client device 100, described above with respect to FIG. 1, as part of establishing a wireless network connection. As shown in FIG. 3, operation of the process may begin at step S302 with a power-up or processor restart of the client device and the process proceeds to step S304.

In step S304, controller 102 may instruct access point scanning unit 118 to perform a full scan for available access points and the process proceeds to step S306.

If, in step 306, the controller determines that access point scanning unit 118 has detected one or more access points, the process proceeds to step S308, otherwise the process returns to step S304.

In step S308, controller 102 may instruct environment analysis unit 122 to analyze the access point information, such as the MAC addresses associated with each detected access point, returned by access point scanning unit 118 and to determine whether client device 100 to an initial operational mode such as, for example, learning mode or map mode. After step S308, the process proceeds to step S310 and terminates.

Figure 4:
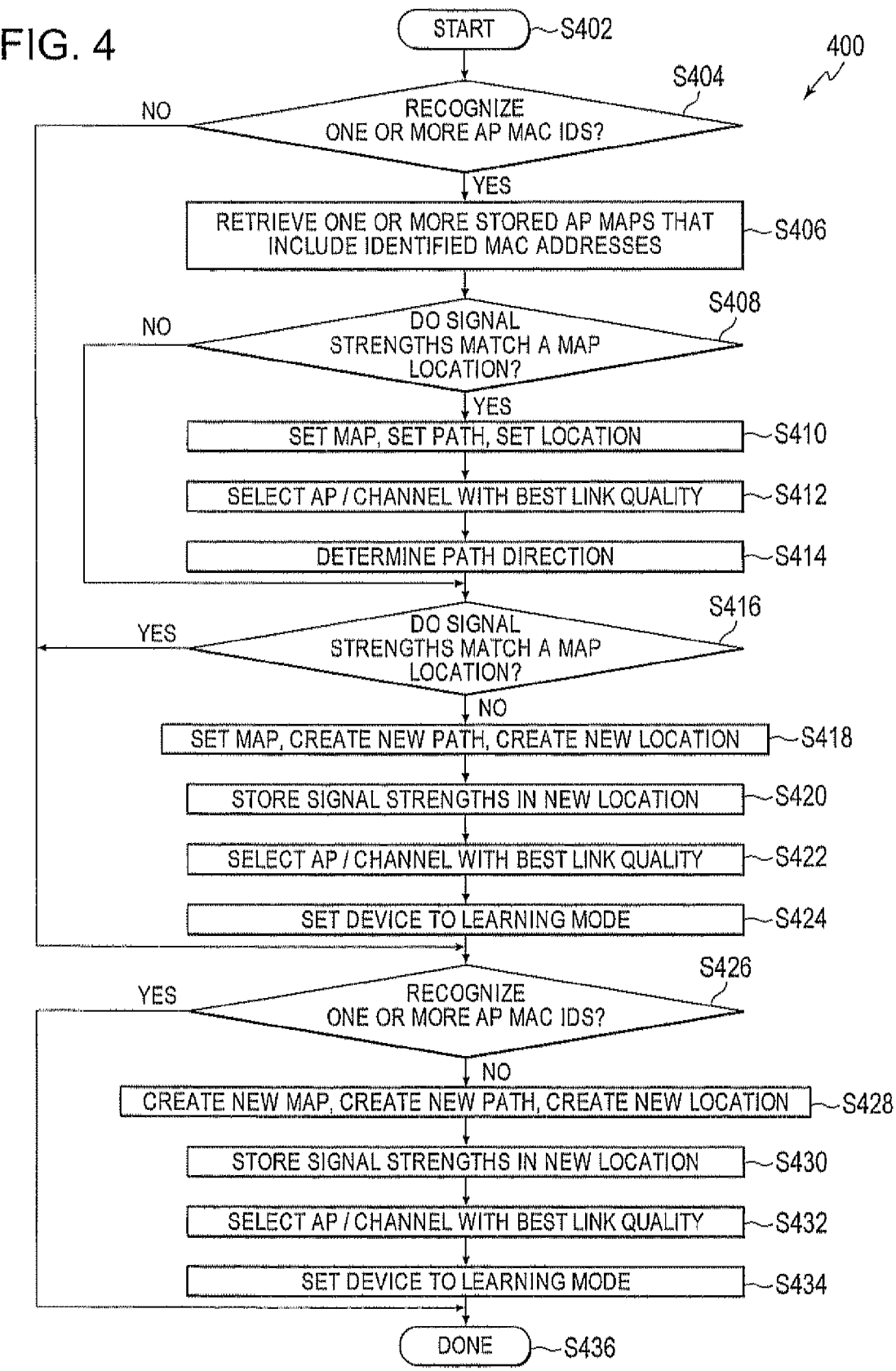
FIG. 4 is a flow diagram of an example of an initial environment analysis process that may be executed by an example of a client device that supports learned roaming optimization.

FIG. 4 is a flow diagram 400 of an example of an initial environment analysis process that may be executed by environment analysis unit 122, as described above with respect to FIG. 3 at block S308. For example, the process described below with respect to FIG. 4 may be executed by environment analysis unit 122 of client device 100, described above with respect to FIG. 1. As shown in FIG. 4, operation of the process may begin at step S402 and the process proceeds to step S404.

If, in step S404, environment analysis unit 122 determines that one or more access points identified by access point scanning unit 118 are associated with a previously mapped operational environment, the process proceeds to step S406, otherwise, the process proceeds to step S426. Note that in order to simplify the structure of the flow diagram presented in FIG. 4, the condition assessed in step S404 and in step S426 is the same, i.e., both steps determine whether one or more access points identified by access point scanning unit 118 are associated with a previously mapped operational environment. However, the conditional branching based on the results of the assessed condition in step S404 is reversed from the conditional branching based on the results of the assessed condition in step S426. This technique is used so that the flow diagram presented in FIG. 4 may be presented as a sequential flow diagram, rather than a flow diagram with parallel process flow branches.

In step S406, environment analysis unit 122 may retrieve from map storage unit 114 the operational environment map that includes the one or more access points identified by access point scanning unit 118, and the process proceeds to step S408.

If, in step S408, environment analysis unit 122 determines that the signal strengths determined by access point scanning unit 118 match a location in the retrieved map, the process proceeds to step S410, otherwise, the process proceeds to step S416.

In step S410, environment analysis unit 122 may set client device status parameters based on the location matched within the stored operational environment map. Specifically, environment analysis unit 122 may set the current map, current path, and current location of the client device to match the map/path/location information associated with the operational environment map location having the same access point signal strength signature as the current client device location, and the process proceeds to step S412.

In step S412, environment analysis unit 122 may select the access point channel identified as capable of providing the best available link quality for initiating a communication link between the client device and the wireless network, and the process proceeds to step S414. Please note that at step S412, the client device has determined that the current location matches a location on a path in a map, but does not know the direction the client device may be traveling along the path. Until the new path and path direction has been determined, the client device has no basis by which to select a best access point based on information stored in the current map. Therefore, at step S412, the client may select a best access point based on any information available to it, such as, for example, the signal strength and/or any other detected environment information. Please also note that the access point selected in step S412 is temporary only. Once the path direction is determined in step S414, e.g., using the process flow diagram described with respect to FIG. 5, the client may again be set to map mode, as shown in FIG. 5 at step S514, and the best access point with the best signal may be selected based on information stored in the current map based on an analysis of all the stored location data along the path to select an access point capable of providing the best overall link quality as the client device traverses the path in the identified direction.

In step S414, environment analysis unit 122 may invoke path direction unit 124 to determine a direction the client device is moving along the current path and to set client device 100 to an initial operational mode, and the process proceeds to step S416.

If, in step S416, environment analysis unit 122 determines that the signal strengths determined by access point scanning unit 118 match a location in the retrieved map, the process proceeds to step S426, otherwise, the process proceeds to step S418.

In step S418, environment analysis unit 122 may set client device status parameters to based on stored operational environment map associated with the one or more access points identified by access point scanning unit 118. Specifically, environment analysis unit 122 may set the current map for the client device to match the operational environment map associated with the one or more identified access points; however, because the signal strengths identified by access point scanning unit 118 do not match a signature of a location stored in the operational environment map, the client device may be assumed to be at a previously uncharted portion of the operational environment addressed by the current map. Therefore, environment analysis unit 122 may instruct map storage unit 114 to create a new path within the stored operational environment map and to create a new location, e.g., $LOC_1$, within the newly created path, and the process proceeds to step S420.

In step S420, environment analysis unit 122 may instruct map storage unit 114 to store in the newly created map location the access point signal strengths measured for the current location, and the process proceeds to step S422.

In step S422, environment analysis unit 122 may select the access point channel with the best available link quality for initiating a communication link between the client device and the wireless network, and the process proceeds to step S424. Please note that at step S422, the client device has determined that the current location does not match any locations for with information is stored in the current map. Therefore, at step S422, the client may select a best access point based on any information available to it, such as, for example, the signal strength and/or any other detected environment information.

In step S424, environment analysis unit 122 may set the client device mode to learning mode, an example of which is described below with respect to FIG. 7, and the process proceeds to step S426.

If, in step S426, environment analysis unit 122 determines that none of the access points identified by access point scanning unit 118 are associated with a previously mapped operational environment, the process proceeds to step S428, otherwise, the process proceeds to step S436 and terminates.

In step S428, environment analysis unit 122 may set client device status parameters based on the assumption that the client device is located within a new operational environment that has not previously been mapped. Specifically, environment analysis unit 122 may instruct map storage unit 114 to create a new map, to create a new path within the new operational environment map and to create a new location, e.g., $LOC_1$, within the newly created path, and the process proceeds to step S430.

In step S430, environment analysis unit 122 may instruct map storage unit 114 to store in the newly created map location the access point signal strengths measured for the current location, and the process proceeds to step S432.

In step S432, environment analysis unit 122 may select the access point channel with the best available link quality for initiating a communication link between the client device and the wireless network, and the process proceeds to step S434. Please note that at step S432, the client device has determined that the current location does not match any locations for with information is stored in any map. Therefore, at step S432, the client may select a best access point based on any information available to it, such as, for example, the signal strength and/or any other detected environment information.

In step S434, environment analysis unit 122 may set the client device mode to learning mode, an example of which is described below with respect to FIG. 7, and the process terminates at step S436.

Figure 5:
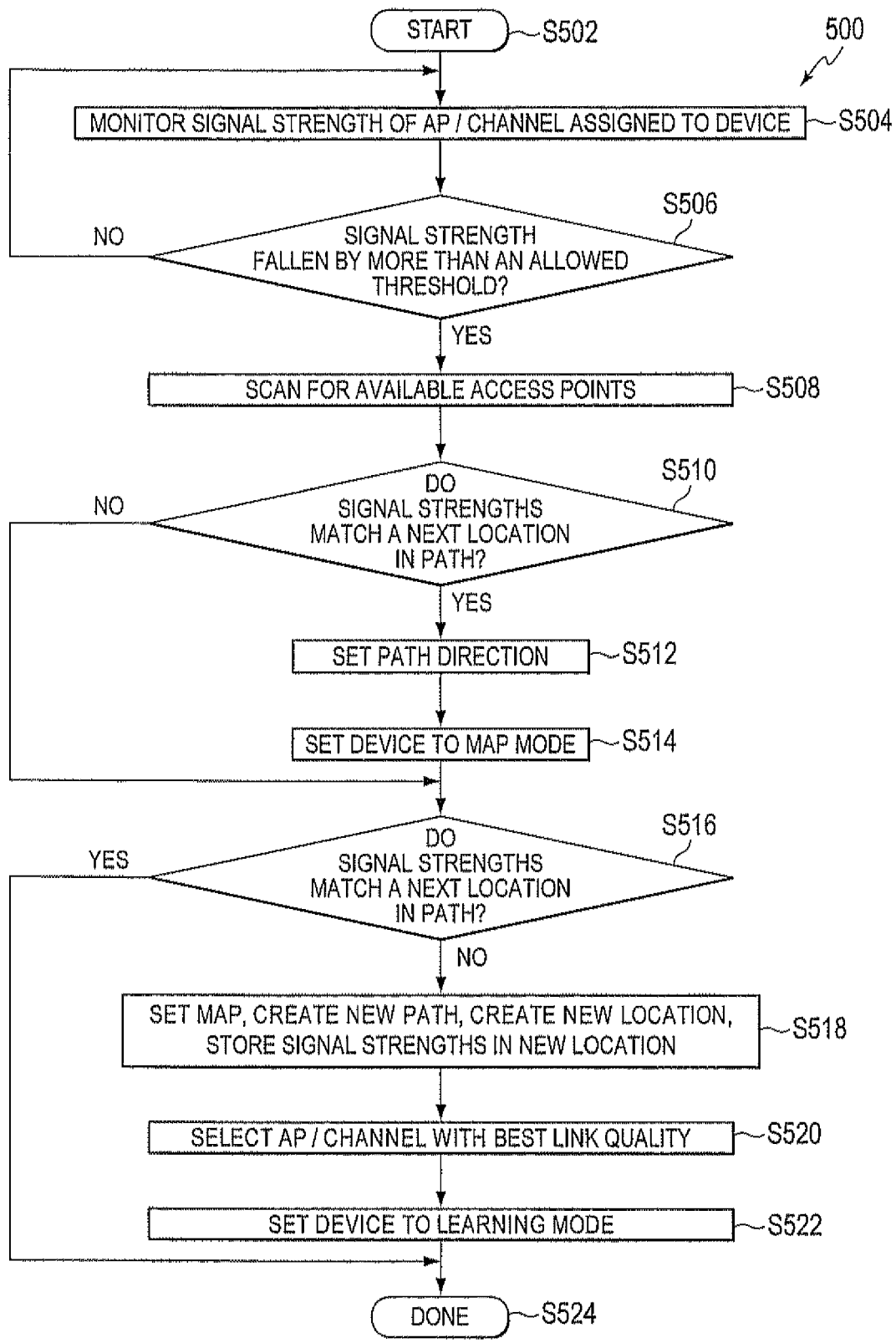
FIG. 5 is a flow diagram of an example of a path direction determining process that may be executed by an example of a client device that supports learned roaming optimization.

FIG. 5 is a flow diagram 500 of an example of a process for determining a direction that a client device is proceeding along a previously mapped path, as described above with respect to FIG. 4 at block S414. For example, the process described below with respect to FIG. 5 may be executed by path direction unit 124 of client device 100, described above with respect to FIG. 1. As shown in FIG. 5, operation of the process may begin at step S502 and the process proceeds to step S504.

In step S504, path direction unit 124 may instruct communication link monitor 120 to monitor the signal strength of the current access point channel currently assigned to and in use by a client device, and the process proceeds to step S506.

If, in step S506, communication link monitor 120 has not informed path direction unit 124 of a drop in signal strength by more than a predetermined allowed drop, the process returns to step S504, otherwise, the process proceeds to step S508.

In step S508, path direction unit 124 may instruct access point scanning unit 118 to scan for available access points. Access point scanning unit 118 may initially perform a partial scan, in which only those access points associated with the operational environment via the currently selected operational environment map may be scanned. If a partial scan of the operational environment does not return an access point with a signal strength above a predetermined threshold, which may be a predetermined threshold chosen for use in the path direction determining process, a full scan may be performed in which the operational environment may be scanned for all available access points. Once the scanning is completed, the process proceeds to step S510.

If, in step S510, the signal access point strengths returned by access point scanning unit 118 to path direction unit 124 match the signature of a next location in the current path, the process proceeds to step S512, otherwise, the process proceeds to step S516. Note that in order to simplify the structure of the flow diagram presented in FIG. 5, the condition assessed in step S510 and in step S516 is the same, i.e., both steps determine whether the detected access point signal strengths detected by access point scanning unit 118 match a next location in a path. However, the conditional branching based on the result of the assessed condition in step S510 is reversed from that of step S516. This technique is used so that the flow diagram presented in FIG. 5 may be presented as a sequential flow diagram, rather than a flow diagram with parallel process flow branches.

In step S512, path direction unit 124 may set the path direction based on position of the detected next location in the map of the path relative to the previous location in the map of the path. For example, if the next location has a higher sequence number than the previous location, the path direction may be set to FORWARD, however, if the next location has a lower sequence number than the previous location, the path direction may be set to REVERSE, and the process proceeds to step S514.

In step S514, path direction unit 124 may set the client device mode to map mode, an example of which is described below with respect to FIG. 6, and the process proceeds to step S516.

If, in step S516, the access point signal strengths returned by access point scanning unit 118 to path direction unit 124 do not match the signature of a next location in the current path, the process proceeds to step S518, otherwise, the process proceeds to step S524 and terminates.

In step S518, path direction unit 124 may set client device status parameters based on the stored operational environment map associated with the one or more access points identified by access point scanning unit 118. Specifically, environment analysis unit 122 may set the current map for the client device to match operational environment map associated with the one or more identified access points; however, because the signal strengths identified by access point scanning unit 118 do not match a next path location stored in the operational environment map, the client device may be assumed to be charting a new path through the operational environment. Therefore, path direction unit 124 may instruct map storage unit 114 to create a new path within the stored operational environment map, to create a new location, e.g., $LOC_1$, within the newly created path, and to store in the newly created map location the access point signal strengths measured for the current location, and the process proceeds to step S520.

In step S520, path direction unit 124 may select the access point channel with the best available link quality for maintaining the communication link between the client device and the wireless network, and the process proceeds to step S522. Please note that at step S520, the client device has determined that the current location does not match a next location in a path stored in the current map and that the client device will be entering learning mode. Therefore, at step S520, the client may select a best access point based on any information available to it, such as, for example, the signal strength and/or any other detected environment information.

In step S522, environment analysis unit 122 may set the client device mode to learning mode, an example of which is described below with respect to FIG. 7, and the process proceeds to step S524 and terminates.

Figure 6:
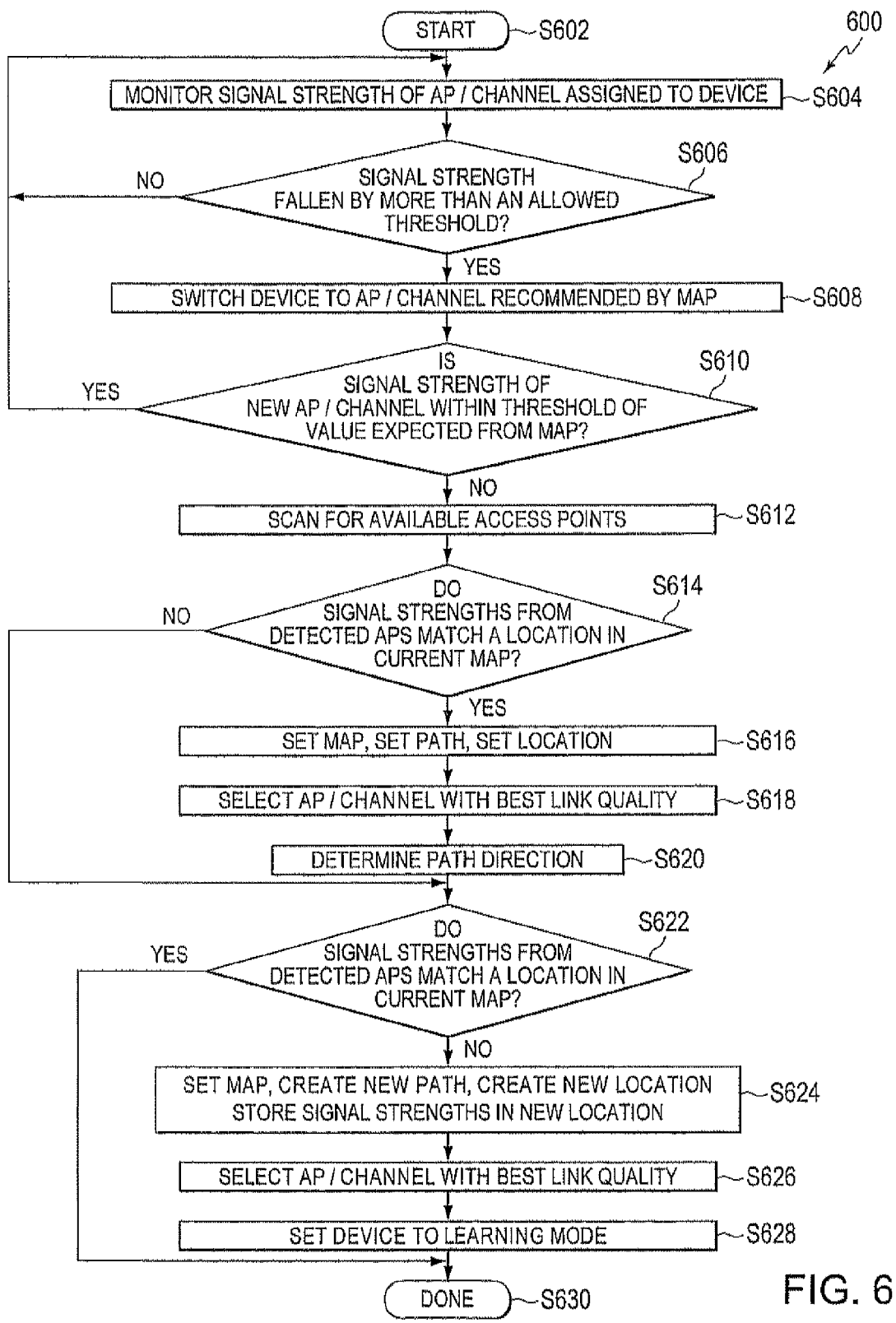
FIG. 6 is a flow diagram of an example of a map-based roaming process that may be executed by an example of a client device that supports learned roaming optimization.

FIG. 6 is a flow diagram 600 of an example of a map-based roaming process, or map mode, that may be executed by an example of a client device that supports learned roaming optimization. For example, the process described below with respect to FIG. 6 may be executed by map mode unit 112 of client device 100, described above with respect to FIG. 1. As shown in FIG. 6, operation of the process may begin at step S602 and the process proceeds to step S604.

In step S604, map mode unit 112 may instruct communication link monitor 120 to monitor the signal strength of the current access point channel currently assigned to and in use by a client device, and the process proceeds to step S606.

If, in step S606, communication link monitor 120 has not informed map mode unit 112 of a drop in signal strength by more than a predetermined allowed drop, the process returns to step S604, otherwise, the process proceeds to step S608.

In step S608, map mode unit 112 may select the access point recommended by the current operational environment map for the current client device location and path direction, and the process proceeds to step S610.

In step S610, map mode unit 112 may request access point scanning unit 118 to perform a partial scan to determine the signal strength of the currently selected access point. If the signal strength of the signal from the current access point is within a predetermined threshold, e.g., first predetermined threshold chosen for use in map mode, of the signal strength predicted by the operational environment map, the process proceeds to step S604, otherwise, the process proceeds to step S612. In this manner, if the signal strength of the new access point is within an expected threshold of the signal strength predicted by the operational environment map, the client device remains in map mode, and the client device continues to select a next access point recommended by the current operational map each time a drop in signal strength is detected that is greater than a predetermined allowed drop.

Please note that, as depicted in FIG. 6, the client device operates in map mode when cycling through steps S604 to S610. Once the signal strength of the new access point no longer remains within an expected threshold of the signal strength predicted by the operational environment map, the client device may perform a scan of available access points, at step S612, and may then determine whether the client device has changed to a new path recorded in the current map, as described in FIG. 6 at steps S614 through S620, or whether the client device is traveling in a new direction not recorded in the current map, and therefore must enter learning mode, as described in FIG. 6 at steps S622 through S628.

In step S612, map mode unit 112 may request access point scanning unit 118 to perform a scan to determine available access points/channels available in the current location. Access point scanning unit 118 may initially perform a partial scan, in which only those access points associated with the operational environment via the currently selected operational environment map may be scanned. If a partial scan of the operational environment does not return an access point with a signal strength above a predetermined threshold, which may be a second predetermined threshold chosen for use in map mode, a full scan may be performed in which the operational environment may be scanned for all available access points. Once the scanning is completed, the process proceeds to step S614.

If, in step S614, the access point signal strengths returned by access point scanning unit 118 to map mode unit 112 match the signature of a location in the current map, the process proceeds to step S616, otherwise, the process proceeds to step S622. Please note that signature matching is one exemplary technique that may be used to determine a location. Location may also be determined, for example, using other methods, e.g., such GPS based location identification.

Further, please note that in order to simplify the structure of the flow diagram presented in FIG. 6, the condition assessed in step S614 and in step S622 is the same, i.e., both steps determine whether the access point signal strengths returned by access point scanning unit 118 match the signature of a location in the current map. However, the conditional branching based on the result of the assessed condition in step S614 is reversed from that of step S622. This technique is used so that the flow diagram presented in FIG. 6 may be presented as a sequential flow diagram, rather than a flow diagram with parallel process flow branches.

In step S616, map mode unit 112 may set client device status parameters based on the location matched within the stored operational environment map. Specifically, map mode unit 112 may set the current map, current path, and current location of the client device to match the map/path/location information associated with the operational environment map location having the same access point signal strength signature as the current client device location, and the process proceeds to step S618.

In step S618, map mode unit 112 may select the access point channel with the best available link quality for maintaining the communication link between the client device and the wireless network, and the process proceeds to step S620. Please note that in the flow diagram presented in FIG. 6 at steps S614 to S620, the client device has already determined that the client device has deviated from first stored path within the current map onto a second stored path within the current map. However, until the new path and path direction has been determined, the client device has no basis by which to select a best access point based on information stored in the current map. Therefore, at step S618, the client may select a best access point based on any information available to it, such as, for example, the signal strength and/or any other detected environment information. Please also note that the access point selected in step S618 is temporary only. Once the path direction is determined in step S620, e.g., using the process flow diagram described with respect to FIG. 5, the client may again be set to map mode, as shown in FIG. 5 at step S514, and the best access point with the best signal may be selected based on information stored in the current map. As described below with respect to FIG. 8, path location information may analyzed using any of a variety of techniques, and a best access point may determined and stored in the map for each location in both a forward and a reverse direction along the path. The analysis performed on the store path location data may be optimized, based on knowledge of the link quality available at subsequent locations along the path, to select for each location and path direction an access point that will provide the best continuity of link quality along the path.

In step S620, map mode unit 112 may invoke path direction unit 124 to determine a direction the client device is moving along the current path, e.g., using the process flow described above with respect to FIG. 5, and the process proceeds to step S622.

If, in step S622, the access point signal strengths returned by access point scanning unit 118 to map mode unit 112, in step S612, do not match the signature of a location in the current map, the process proceeds to step S624, otherwise, the process proceeds to step S630 and terminates.

In step S624, map mode unit 112 may set the current map for the client device to match the currently selected operational environment map; however, because the signal strengths identified by access point scanning unit 118 do not match a signature of a location stored in the operational environment map, the client device may be assumed to be at a previously uncharted portion of the operational environment addressed by the current map. Therefore, map mode unit 112 may instruct map storage unit 114 to create a new path within the stored operational environment map, to create a new location, e.g., $LOC_1$, within the newly created path, and to store in the newly created map location the access point signal strengths measured for the current location, and the process proceeds to step S626.

In step S626, map mode unit 112 may select the access point channel with the best available signal quality for maintaining the communication link between the client device and the wireless network, and the process proceeds to step S628. Please note that in the flow diagram presented in FIG. 6 at steps S622 to S628, the client device has already determined that the client device has deviated from a stored path within the current map and is currently at a location not stored within the current map, therefore, the client device may prepare for a transition to learning mode. Learning mode is described in detail with respect to FIG. 7, below. However, since the client is no longer in map mode, the client device has no basis by which to select a best access point based on information stored in the current map. Therefore, at step S626, the client may select a best access point based on any information available to it, such as, for example, the signal strength and/or any other detected environment information.

In step S628, map mode unit 112 may set the client device mode to learning mode, an example of which is described below with respect to FIG. 7, and the process terminates at step S630.

Figure 7:
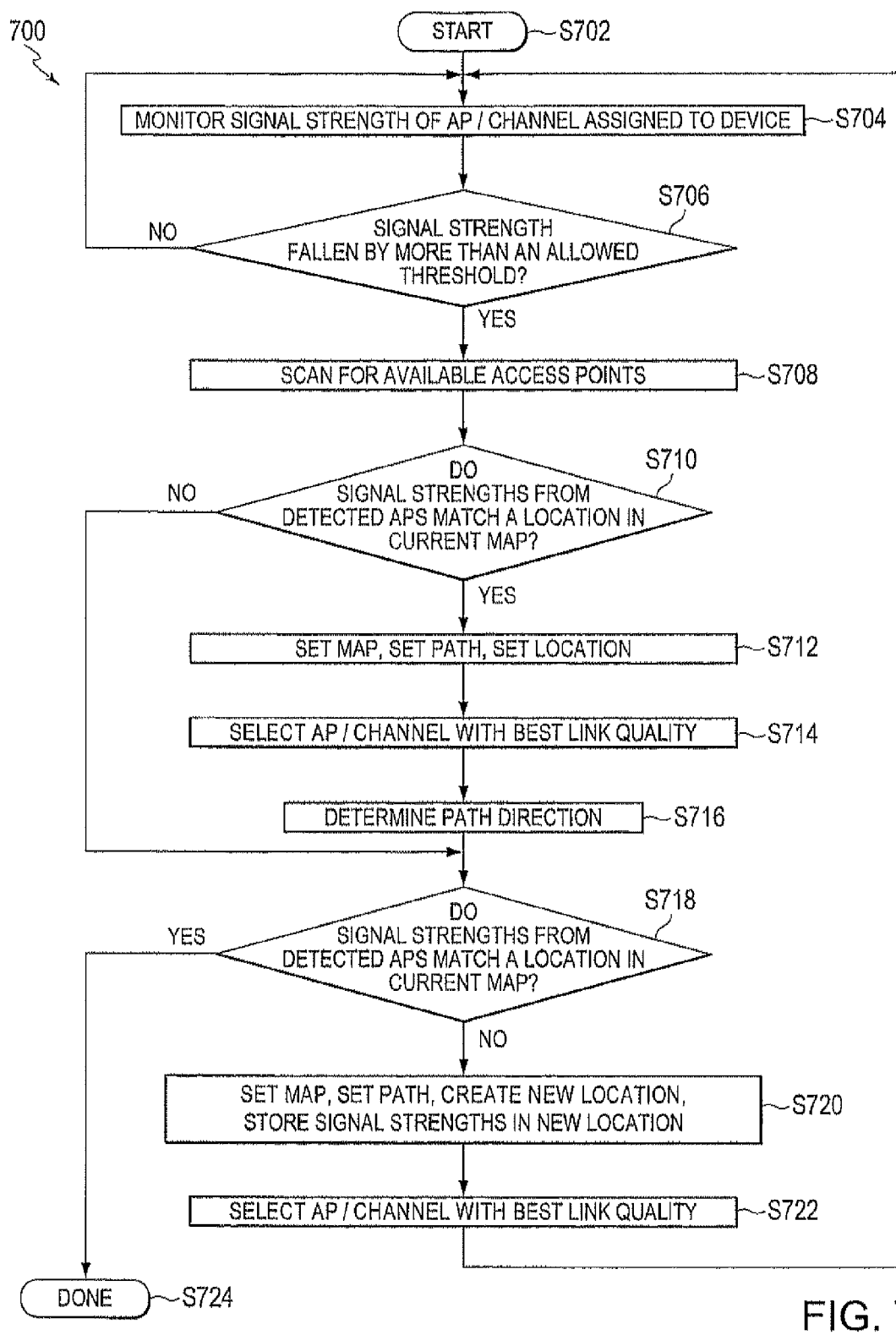
FIG. 7 is a flow diagram of an example of a self learning, or map creation, process that may be executed by an example of a client device that supports learned roaming optimization.

FIG. 7 is a flow diagram 700 of an example of an operational environment map creation process, or learning mode, that may be executed by an example of a client device that supports learned roaming optimization, particularly self learning. For example, the process described below with respect to FIG. 7 may be executed by learning mode unit 110 of client device 100, described above with respect to FIG. 1.

Please note that while in learning mode, each time a currently selected AP signal strength falls below a predetermined threshold, a client device may scan available access points and selected a best access point based on, for example, signal strength and/or other link quality parameters. However, signal strength and other link quality parameters collected at each new location may be stored by the client device as path location data. As described below with respect to FIG. 8, the collected path location information may subsequently analyzed using any of a variety of techniques, and a best access point may determined and stored in the map for each location in both a forward and a reverse direction along the path.

As shown in FIG. 7, operation of the process may begin at step S702 and the process proceeds to step S704.

In step S704, learning mode unit 110 may instruct communication link monitor 120 to monitor the signal strength of the current access point channel currently assigned to and in use by a client device, and the process proceeds to step S706.

If, in step S706, communication link monitor 120 has not informed learning mode unit 110 of a drop in signal strength by more than a predetermined allowed drop, the process returns to step S704, otherwise, the process proceeds to step S708.

In step S708, learning mode unit 110 may request access point scanning unit 118 to perform a scan to determine available access points/channels available in the current location. Access point scanning unit 118 may initially perform a partial scan, in which only those access points associated with the operational environment via the currently selected operational environment map may be scanned. If a partial scan of the operational environment does not return an access point with a signal strength above a predetermined threshold, which may be a predetermined threshold chosen for use in learning mode, a full scan may be performed in which the operational environment may be scanned for all available access points. Once the scanning is completed, the process proceeds to step S710.

If, in step S710, the access point signal strengths returned by access point scanning unit 118 to learning mode unit 110 match the signature of a location in the current map, the process proceeds to step S712, otherwise, the process proceeds to step S718. Note that in order to simplify the structure of the flow diagram presented in FIG. 7, the condition assessed in step S710 and in step S718 is the same, i.e., both steps determine whether scanned access point signal strength information matches a location in a stored map. However, the conditional branching based on the result of the assessed condition in step S710 is reversed from that of step S718. This technique is used so that the flow diagram presented in FIG. 7 may be presented as a sequential flow diagram, rather than a flow diagram with parallel process flow branches.

In step S712, learning mode unit 110 may set client device status parameters based on the location matched within the stored operational environment map. Specifically, learning mode unit 110 may set the current map, current path, and current location of the client device to match the map/path/location information associated with the operational environment map location having the same access point signal strength signature as the current client device location, and the process proceeds to step S714.

In step S714, learning mode unit 110 may select the access point channel with the best link quality for maintaining the communication link between the client device and the wireless network, and the process proceeds to step S716. Please note that in the flow diagram presented in FIG. 7 at steps S710 to S716, the client device has already determined that the client device is at a location previously stored in a path in a stored map. However, until the new path and path direction has been determined, the client device has no basis by which to select a best access point based on information stored in the current map. Therefore, at step S714, the client may select a best access point based on any information available to it, such as, for example, the signal strength and/or any other detected environment information. Please also note that the access point selected in step S714 is temporary only. Once the path direction is determined in step S716, e.g., using the process flow diagram described with respect to FIG. 5, the client may again be set to map mode, as shown in FIG. 5 at step S514, and the best access point with the best signal may be selected based on information stored in the current map. As described below with respect to FIG. 8, path location information may analyzed using any of a variety of techniques, and a best access point may determined and stored in the map for each location in both a forward and a reverse direction along the path. The analysis performed on the store path location data may be optimized, based on knowledge of the link quality available at subsequent locations along the path, to select for each location and path direction an access point that will provide the best continuity of link quality along the path.

In step S716, learning mode unit 110 may invoke path direction unit 124 to determine a direction the client device is moving along the current path, and the process proceeds to step S718.

If, in step S718, the access point signal strengths returned by access point scanning unit 118 to learning mode unit 110, in step S708, do not match the signature of a location in the current map, the process proceeds to step S720, otherwise, the process proceeds to step S724 and terminates.

In step S720, learning mode unit 110 may set the current map and current path for the client device to match the currently selected operational environment map and the current path; however, because the signal strengths identified by access point scanning unit 118 do not match a signature of a location stored in the operational environment map, the client device may be assumed to be at a previously uncharted next location in the current path. Therefore, learning mode unit 110 may instruct map storage unit 114 to create a new location, e.g., $LOC_1$, within the current path, and to store in the newly created map location the access point signal strengths measured for the current location, and the process proceeds to step S722.

In step S722, learning mode unit 110 may select the access point channel with the best link quality for maintaining the communication link between the client device and the wireless network, and the process returns to step S704. Please note that in the flow diagram presented in FIG. 7 at steps S718 to S722, the client device has determined that the client device is at a location not previously stored in a path in a map. Therefore, the client device has no basis by which to select a best access point based on information stored in a current map. Therefore, at step S722, the client may select a best access point based on any information available to it, such as, for example, the signal strength and/or any other detected environment information.

Figure 8:
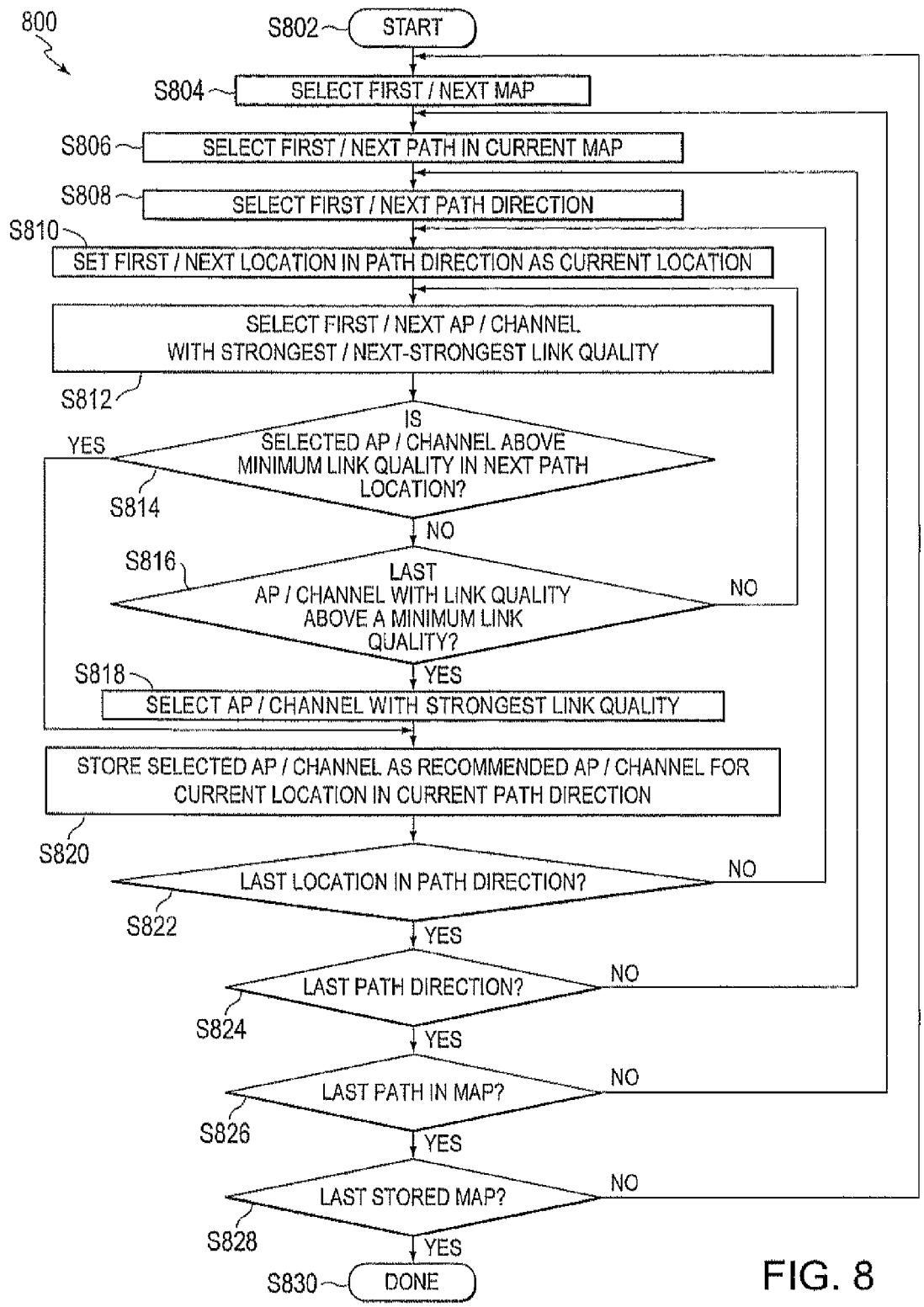
FIG. 8 is a flow diagram of an example of a process for updating maps created using the process flow described in FIG. 7 to include optimized access point selections.

FIG. 8 is a flow diagram 800 of an example of a process for updating maps, created, for example, using the learning mode process flow described above with respect to FIG. 7, to include optimized access point selections for use in the map mode process flow described above with respect to FIG. 6 at steps S604 to S610. For example, the process described below with respect to FIG. 8 may be executed by path analysis unit 116 of client device 100, described above with respect to FIG. 1. Please note that the process flow described below with respect to FIG. 8 assumes that path analysis unit 116 has been invoked to process a client device map database, e.g., stored by map storage unit 114 of client device 100, that include maps for multiple operational environments; however, a similar process flow may be used to optimized access point selections for a single operational environment map, e.g. by removing steps S804 and S828, or a single path within an operational environment map, e.g., by removing steps S804, S806, S826 and S828.

The process described below with respect to FIG. 8 may assess the data collected for locations along a path by looking at the signal strength and/or other signal quality measures of each location in the path, in view of the signal strength and/or other signal quality measures of subsequent locations in a selected direction along the path. Using the approach described below with respect to FIG. 8, a next best signal quality may be accepted at a location along a path in order assure that an acceptable level of signal quality is maintained by the client device along the entire path.

As shown in FIG. 8, operation of the process may begin at step S802 and the process proceeds to step S804.

In step S804, path analysis unit 116 may select a first, or next, map from map storage unit 114, and the process proceeds to step S806.

In step S806, path analysis unit 116 may select a first, or next, path in the selected map, and the process proceeds to step S808.

In step S808, path analysis unit 116 may select a first, or next, path direction in the selected path, e.g., forward or reverse, as described above with respect to Table 1 and Table 2 and FIG. 5, step S512, and the process proceeds to step S810.

In step S810, path analysis unit 116 may select a first, or next, location in the selected path direction, and the process proceeds to step S812.

In step S812, path analysis unit 116 may select from the selected location the first, or next, access point with the strongest/next-strongest link quality, and the process proceeds to step S814. The client may select the access point with the strongest/next-strongest link quality based on any information available to the client device stored in the current map for the current location, such as, for example, the signal strength and/or any other environment information stored in the map.

If, in step S814, path analysis unit 116 determines, e.g., based on data stored by map storage unit 114, that the current selected access point is capable of providing a link quality above a minimum threshold, e.g., the access point provides a signal strength of at least 65% of full signal strength, at the next path location, the process proceeds to step S820, otherwise, the process proceeds to step S816. The client may assess the link quality that may be provided by the access point at a location based on any information available to the client device stored in the current map for the location, such as, for example, the signal strength and/or any other environment information stored in the map.

If, in step S816, path analysis unit 116 determines that the current selected access point is a last access point associated with the selected location capable of providing a link quality above a minimum link quality, the process proceeds to step S818, otherwise, the process returns to step S812.

In step S818, path analysis unit 116 may select the access point channel capable of providing the strongest link quality as the current communication link for the client device, and the process proceeds to step S820.

In step S820, path analysis unit 116 may instruct map storage unit 114 to store the currently selected access point as the recommended access point for the currently selected direction. For example, based on the example of an operational environment map described above with respect to Table 1 ad Table 2, the recommended access point may be stored in one of $DIR_{FOR}$ and $DIR_{REV}$, depending on whether the current path direction is FORWARD or REVERSE, and the process proceeds to step S822.

If, in step S822, path analysis unit 116 determines that the current selected location is the last location in the current selected path direction, the process proceeds to step S824 otherwise, the process returns to S810.

If, in step S824, path analysis unit 116 determines that the current selected path direction is the last path direction in the current selected path, the process proceeds to step S826 otherwise, the process returns to S808.

If, in step S826, path analysis unit 116 determines that the current selected path is the last path in the current selected map, the process proceeds to step S828 otherwise, the process returns to S806.

If, in step S828, path analysis unit 116 determines that the current selected map is the last map in the current selected database, the process proceeds to step S830 and terminates otherwise, the process returns to S804.

For purposes of explanation, in the above description, numerous specific details are set forth in order to provide a thorough understanding of the described client device that supports the described learned roaming optimization approach. It is noted, however, that the described client device that supports the described learned roaming optimization approach may be practiced without these specific details. In other instances, well-known structures and devices are shown in block diagram form in order to avoid obscuring the features of the described client device and described learned roaming optimization approach.

While the described client device and described learned roaming optimization approach have been described in conjunction with the specific embodiments thereof, it is evident that many alternatives, modifications, and variations will be apparent to those skilled in the art. Accordingly, embodiments of the described client device and described learned roaming optimization approach as set forth herein are intended to be illustrative, not limiting. There are changes that may be made without departing from the spirit and scope of the invention.

For example, it is to be understood that various functions of the described client device that support the described learned roaming optimization approach may be distributed in any manner among any quantity (e.g., one or more) of hardware and/or software modules or units that may be interconnected with circuitry and/or software interfaces.

The described client device that supports embodiments of the described learned roaming optimization approach may be integrated within virtually any portable and/or stationary device including, but not limited to, cell phones, personal digital assistants, laptop computers, workstation computers, printers, scanners, network routers and/or other access points to local and/or wide area networks, cameras, child tracking/ monitoring devices etc. The described client device that supports the described learned roaming optimization approach may be integrated within any device from which a user benefit may be derived by passing information to and/or receiving information from the device via a wireless network.

The described client devices that support the described learned roaming optimization approach may include any commercially available operating system (e.g., Windows, OS/2, Unix, Linux, DOS, etc.), any commercially available and/or custom software (e.g., communication software, etc.), any type of commercially available application specific IC (ASIC), any type of commercially available ternary content addressable memory (TCAM), any type of commercially available input/output device (e.g., keyboard, mouse, probes, I/O port, etc.) and/or any other commercially available component.

Control software, or firmware, for the described client devices that support the described learned roaming optimization approach may be implemented in any desired computer language, and may be developed by one of ordinary skill in the computer and/or programming arts based on the functional description contained herein and illustrated in the drawings. For example, in one exemplary embodiment the described system may be written using the C++ programming language or the JAVA programming language. However, the present invention is not limited to being implemented in any specific programming language or combination of programming languages.

Any software associated with the described client device that supports the described learned roaming optimization approach may be distributed via any suitable media (e.g., removable memory cards, CD-ROM, tape or other storage media diskette, ad-hoc network connection). Software and/or default control parameters may be installed in any manner (e.g., an install program, copying files, entering an execute command, etc.).

The described client devices that support the described learned roaming optimization approach may accommodate any quantity and any type of data set files and/or databases or other structures containing stored data in any desired format (e.g., ASCII, plain text, or other format, etc.). The format and structure of internal information structures, such as the described local data stores and control parameters, used to hold intermediate information in support of the described client devices may include any and all structures and fields and may include, but are not limited to files, arrays, matrices, status and control booleans/variables.

Further, any references herein to software performing various functions generally refer to computer systems or processors performing those functions under software control. The computer system may alternatively be implemented by hardware or other processing circuitry. The various functions that support embodiments of the described client devices that support the described learned roaming optimization approach may be distributed in any manner among any quantity (e.g., one or more) of hardware and/or software modules or units, computers or processing systems or circuitry.

From the foregoing description, it will be appreciated that a client device that supports the described learned roaming optimization approach is disclosed. The described approach is compatible and may be seamlessly integrated within compliant hardware devices.

While a method and apparatus are disclosed that provide client devices that support the described learned roaming optimization approach, various modifications, variations and changes are possible within the skill of one of ordinary skill in the art, and fall within the scope of the present invention. Although specific terms are employed herein, they are used in their ordinary and accustomed manner only, unless expressly defined differently herein, and not for purposes of limitation.

What is claimed is:

1. A client device that maintains a network connection between the client device and a wireless computer network, the client device comprising:
   a path direction unit that identifies a path in a map by comparing signal strengths of a location associated with the path against previously stored signal strengths of the location;
   a link quality monitor that assesses a link quality of the network connection; and
   a map mode unit that selects a next wireless network access point for use by the client device for connecting to the wireless computer network based on the assessed link quality at a determined location of the client device in the path and an access point assignment for a next location in the path contained in the map of an operational environment of the wireless computer network.

2. The client device of claim 1, wherein an access point assignment for each of selected locations in the path in the operational environment is a function of the determined location of the client device in the path.

3. The client device of claim 1, further comprising:
   an access point scanning unit that obtains measures of link quality between the client device and a plurality of wireless network access points for each of locations in the path,
   wherein a map storage unit stores the measures of link quality for each location in the path in the map of the operational environment.

4. The client device of claim 3, further comprising:
   a path analysis unit configured to generate an access point assignment for each of a plurality of locations in the path in the map of the operational environment.

5. The client device of claim 3, wherein the access point assignment is based, in part, on the determined location of the client device in the path, a determined direction of the client device along the path, and the stored measures of link quality for locations in the path in the direction of the client device along the path.

6. The client device of claim 3, wherein the access point scanning unit, in obtaining the measures of link quality between the client device and the plurality of wireless network access points for the location in the path, scans only wireless network access points identified in the map of the operational environment.

7. The client device of claim 3, further comprising:
   a path analysis unit analyzes the measured signal strengths for a plurality of locations in the path in a selected direction along the path to determine the access point assignment for the location and updates the map to include the access point assignment for the location in the path.

8. The client device of claim 1, wherein the access point assignment for each location in the path corresponds to a wireless network access point that has the best reception over selected next locations along the path.

9. The client device of claim 1, wherein the access point assignment for each location in the path corresponds to a wireless network access point with a best continuity of reception as compared with other wireless network access points in the map at subsequent locations in the path in a direction traveled by the client device along the path.

10. The client device of claim 1, further comprising:
a map storage unit that stores an access point assignment for selected locations in the path in the map; and
the path direction unit that determines a direction in which the client device is traveling along the path,
wherein the access point assignment for each of locations in the path in the operational environment is a function of the determined location of the client device in the path and the determined direction in which the client device is traveling along the path.

11. The client device of claim 1, wherein the link quality monitor monitors a link quality of a wireless connection between the client device and a wireless network access point and generates an alert upon determining that the link quality has fallen below a predetermined minimum threshold.

12. The client device of claim 1, further comprising:
a network physical layer unit that supports wireless communication with a wireless network access point in accordance with a predetermined standard.

13. The client device of claim 12, wherein the predetermined standard is compatible with IEEE standard 802.11.

14. The client device of claim 1, further comprising:
a map storage unit that stores an access point assignment for each location in the path in a memory of the client device.

15. The client device of claim 1, further comprising:
a map storage unit that stores an access point assignment for each location in the path in a non-volatile memory of the client device.

16. A method of maintaining a network connection between a client device and a wireless computer network, comprising:
generating an access point assignment for each of a plurality of locations in a path in a map of an operational environment;
identifying the path in the map by comparing signal strengths of a location associated with the path against previously stored signal strengths of the location; and
selecting a next wireless network access point for use by the client device for connecting to the wireless computer network based on a determined location of the client device in the path and the access point assignment for a next location in the path contained in the map.

17. The method of claim 16, further comprising:
assessing a link quality of the network connection.

18. The method of claim 16, wherein the access point assignment for each of the plurality of locations in the path in the operational environment is a function of the determined location of the client device in the path.

19. The method of claim 16, further comprising:
obtaining measures of link quality between the client device and a plurality of wireless network access points for each of the plurality of locations in the path; and
storing the measures of link quality for each location in the path in the map of the operational environment.

20. The method of claim 19, wherein, in obtaining measures of link quality between the client device and the plurality of wireless network access points for the location in the path, scanning only wireless network access points identified in the map of the operational environment.

21. The method of claim 19, further comprising:
analyzing the measures of link quality for a plurality of locations in the path to determine the access point assignment for the location and update the stored operational environment map to include the access point assignment for the location in the path.

22. The method of claim 16, wherein the access point assignment for each location in the path corresponds to a wireless network access point with a best overall reception for a plurality of locations along the path.

23. The method of claim 16, wherein the access point assignment for each location in the path corresponds to a wireless network access point with a best overall reception for a plurality of next locations along the path.

24. The method of claim 16, wherein the access point assignment for each location in the path corresponds to a wireless network access point with a stronger reception than other wireless network access points in the map at subsequent locations in the path in a direction traveled by the client device along the path.

25. The method of claim 16, wherein the access point assignment for each location in the path corresponds to a wireless network access point with a most continuous reception along next locations in the path in a direction traveled by the client device along the path.

26. The method of claim 16, further comprising:
storing the access point assignment for the locations in the path in the map of the operational environment; and
determining a direction in which the client device is traveling along the path,
wherein the access point assignment for each of the plurality of locations in the path in the operational environment is a function of the determined location of the client device in the path and the determined direction in which the client device is traveling along the path.

27. The method of claim 16, further comprising:
monitoring a link quality of a wireless connection between the client device and a wireless network access point; and
generating an alert upon determining that the link quality has fallen below a predetermined minimum threshold.

28. The method of claim 16, wherein wireless communication with a wireless network access point is in accordance with a predetermined standard.

29. The method of claim 28, wherein the predetermined standard is compatible with IEEE standard 802.11.

30. The method of claim 16, further comprising:
storing the access point assignment for each location in a path in a memory of the client device.

31. The method of claim 16, further comprising:
storing the access point assignment for each location in a path in a non-volatile memory of the client device.

32. A method of maintaining a network connection between a client device and a wireless computer network, comprising:
identifying a path in a map by comparing signal strengths of a location associated with the path against previously stored signal strengths of the location;
monitoring a link quality of the network connection between the client device and the wireless computer network; and
selecting a wireless network access point defined in the map of an operational environment for a next connection based on the link quality of the network connection at a plurality of locations in the path.

33. The method of claim 32, wherein determining the location of the client device in the path in the operational environment, further comprises:
scanning wireless network access points identified by the map of the operational environment, thereby obtaining a measure of a link quality between the client device at the location and the wireless network access points; and matching the obtained measures of link quality with measures of link quality stored in the map of the operational environment.

34. The method of claim 32, further comprising:
determining a path direction that the client device is traversing along the path through the operational environment; and
determining a next location in the path based in the path direction.

35. The method of claim 34, wherein determining a path direction, further comprises:
monitoring a link quality of the network connection;
scanning wireless network access points identified by the map of the operational environment, thereby obtaining a measure of a link quality between the client device at a second location and the wireless network access points; and
matching the obtained measures of link quality with measures of link quality stored in the map of the operational environment.

36. The method of claim 32, wherein the map of the operational environment defines a wireless network access point for each of a plurality of locations in each of a plurality of paths through the operational environment.

37. The method of claim 32, wherein the wireless network access point defined in the map of the operational environment for a next location in the path corresponds to a wireless network access point with a better link quality for a plurality of locations along the path than other wireless network access points in the map.

38. The method of claim 32, wherein the wireless network access point defined in the map of the operational environment for a next connection corresponds to a wireless network access point with a weaker link quality at a next location than other wireless network access points in the map.

39. The method of claim 32, wherein the wireless network access point defined in the map of the operational environment for a next connection corresponds to a wireless network access point with an improved connection quality at a plurality of next locations as compared with other wireless network access points in the map.

40. The method of claim 32, wherein the map of the operational environment is stored in a memory of the client device.

41. The method of claim 32, wherein the map of the operational environment is stored in a non-volatile memory of the client device.

* * * * *